US011662610B2

(12) United States Patent
Wu et al.

(10) Patent No.: US 11,662,610 B2
(45) Date of Patent: May 30, 2023

(54) SMART DEVICE INPUT METHOD BASED ON FACIAL VIBRATION

(71) Applicant: SHENZHEN UNIVERSITY, Shenzhen (CN)

(72) Inventors: Kaishun Wu, Shenzhen (CN); Maoning Guan, Shenzhen (CN)

(73) Assignee: SHENZHEN UNIVERSITY, Shenzhen (CN)

(*) Notice: Subject to any disclaimer, the term of this patent is extended or adjusted under 35 U.S.C. 154(b) by 181 days.

(21) Appl. No.: 17/051,179

(22) PCT Filed: Apr. 8, 2019

(86) PCT No.: PCT/CN2019/081676
§ 371 (c)(1),
(2) Date: Oct. 28, 2020

(87) PCT Pub. No.: WO2020/206579
PCT Pub. Date: Oct. 15, 2020

(65) Prior Publication Data
US 2021/0233533 A1 Jul. 29, 2021

(51) Int. Cl.
G10L 15/24 (2013.01)
G10L 25/84 (2013.01)
(Continued)

(52) U.S. Cl.
CPC .............. G10L 15/24 (2013.01); G01H 11/08 (2013.01); G02C 11/10 (2013.01); G06F 3/011 (2013.01);
(Continued)

(58) Field of Classification Search
CPC ......... G10L 25/24; G10L 25/84; G01H 11/08; G06F 3/011
(Continued)

(56) References Cited

U.S. PATENT DOCUMENTS 8,082,149 B2 * 12/2011 Schultz ................... G10L 15/24
704/235
2003/0233233 A1 * 12/2003 Hong ...................... G10L 15/20
704/256.5
(Continued)

FOREIGN PATENT DOCUMENTS

CN 101950249 A 1/2011
CN 104123930 A * 10/2014 ............. G10L 15/24
(Continued)

Primary Examiner — Richemond Dorvil
Assistant Examiner — Rodrigo A Chavez
(74) Attorney, Agent, or Firm — Bayramoglu Law Offices LLC

(57) ABSTRACT

A smart device input method based on facial vibration includes: collecting a facial vibration signal generated when a user performs voice input; extracting a Mel-frequency cepstral coefficient from the facial vibration signal; and taking the Mel-frequency cepstral coefficient as an observation sequence to obtain text input corresponding to the facial vibration signal by using a trained hidden Markov model. The facial vibration signal is collected by a vibration sensor arranged on glasses. The vibration signal is processed by: amplifying the collected facial vibration signal; transmitting the amplified facial vibration signal to the smart device via a wireless module; and intercepting a section from the received facial vibration signal as an effective portion and extracting the Mel-frequency cepstral coefficient from the effective portion by the smart device.

6 Claims, 4 Drawing Sheets

(51) Int. Cl.
  *G01H 11/08* (2006.01)
  *G02C 11/00* (2006.01)
  *G06F 3/01* (2006.01)
  *G06K 9/62* (2022.01)
  *G10L 25/78* (2013.01)

(52) U.S. Cl.
  CPC ........... *G06K 9/627* (2013.01); *G06K 9/6256* (2013.01); *G10L 25/84* (2013.01); *G10L 2025/783* (2013.01)

(58) Field of Classification Search
  USPC ........................................................ 704/231
  See application file for complete search history.

(56) References Cited

U.S. PATENT DOCUMENTS

| | | | |
|---|---|---|---|
| 2005/0047664 A1* | 3/2005 | Nefian | G06K 9/6293 382/228 |
| 2006/0064037 A1* | 3/2006 | Shalon | G16H 20/60 128/903 |
| 2016/0111111 A1* | 4/2016 | Levitt | G10L 21/013 704/226 |
| 2017/0069306 A1* | 3/2017 | Asaei | G10L 19/0018 |
| 2019/0074028 A1* | 3/2019 | Howard | G10L 15/20 |
| 2019/0204907 A1* | 7/2019 | Xie | G06F 3/017 |
| 2019/0221205 A1* | 7/2019 | Czyryba | G06N 3/0454 |

FOREIGN PATENT DOCUMENTS

| | | |
|---|---|---|
| CN | 104123930 A | 10/2014 |
| CN | 104538041 A | 4/2015 |
| CN | 105988768 A | 10/2016 |
| CN | 108735219 A | 11/2018 |

* cited by examiner

SMART DEVICE INPUT METHOD BASED ON FACIAL VIBRATION

CROSS-REFERENCE TO THE RELATED APPLICATIONS

This application is the national stage entry of International Application No. PCT/CN2019/081676, filed on Apr. 8, 2019, the entire contents of which are incorporated herein by reference.

TECHNICAL FIELD

The present disclosure relates to the field of text input, and more particularly, to a smart device input method based on facial vibration.

BACKGROUND

In a traditional smart device input method, typing input through a keyboard or voice recognition input is implemented. However, with the development of wearable devices, limitations of this method gradually appear. For example, in a smart watch input method, a virtual keyboard on a touch screen is used for typing input. However, it is difficult for a user to perform typing input because the smart watch has a small screen. For another example, it is also difficult for the user to perform typing input when the user wears gloves.

At present, there exists a method for performing handwriting input by using finger tracking, such that users only need to draw numerics or letters that they want to input with fingers in the air to perform handwriting input. However, this input method is too slow, and when the users hold something in their hands, this handwriting input method is not applicable. There also exists another input method, a knuckle of a hand wearing the watch is mapped as a nine-square-shaped virtual keyboard, and typing input is performed by knocking using a thumb. However, this input method is also not practical when the user's hand wearing the watch holds something. Traditional speech recognition technologies are susceptible to ambient noise as well as replay attacks and imitation attacks.

Therefore, it is necessary to improve the existing technologies so as to provide a more accurate and more efficient text input method.

SUMMARY

An objective of the present disclosure is to overcome the defects of the existing technologies by providing a smart device input method based on facial vibration.

According to a first aspect of the present disclosure, there is provided a smart device input method based on facial vibration. The method comprises following steps:

Step S1: collecting a facial vibration signal generated when a user performs voice input;

Step S2: extracting a Mel-frequency cepstral coefficient from the facial vibration signal; and Step S3: taking the Mel-frequency cepstral coefficient as an observation sequence to obtain text input corresponding to the facial vibration signal by using a trained hidden Markov model.

In one embodiment, in Step S1, the facial vibration signal is collected by a vibration sensor arranged on glasses.

In one embodiment, in Step S2, a vibration signal is processed by amplifying the collected facial vibration signal, transmitting the amplified facial vibration signal to the smart device via a wireless module, and intercepting a section from the received facial vibration signal as an effective portion and extracting the Mel-frequency cepstral coefficient from the effective portion by the smart device.

In one embodiment, the intercepting the effective portion from the facial vibration signal comprises:

setting a first cut-off threshold and a second cut-off threshold based on a short-term energy standard deviation $\sigma$ of the facial vibration signal, wherein the first cut-off threshold is $TL=u+\sigma$, the second cut-off threshold is $TH=u+3\sigma$, and u represents average energy of background noise;

finding out a frame signal having a maximum short-term energy from the facial vibration signal, wherein energy of the frame signal is higher than the second cut-off threshold; and respectively finding out, from a preamble frame before the frame signal and a postamble frame after the frame signal, a frame whose energy is lower than the first cut-off threshold and is closest to the frame signal in time sequence, taking an obtained preamble frame position as a starting point and an obtained postamble frame position as an end point, and intercepting a portion between the starting point and the end point as the effective portion of the facial vibration signal.

In one embodiment, the intercepting the effective portion from the facial vibration signal further comprise: setting, for a vibration signal, a maximum interval threshold maxInter and a minimum length threshold minLen between signal peaks; and taking two signal peaks as one signal peak of the vibration signal in response to an interval between the two signal peaks of the vibration signal being less than the maximum interval threshold maxInter; and discarding a signal peak in response to a length of the signal peak of the vibration signal being less than the minimum length threshold minLen.

In one embodiment, training the hidden Markov model comprises:

generating a corresponding hidden Markov model for each input button type of the smart device to obtain a plurality of hidden Markov models;

constructing a corresponding training sample set for each hidden Markov model, wherein each observation sequence in the training sample set comprises the Mel-frequency cepstral coefficient of a facial vibration signal; and evaluating the hidden Markov model that is most likely to generate a pronunciation represented by the observation sequence as the trained hidden Markov model.

In one embodiment, the Step S3 further comprises: calculating an output probability of a test sample for the plurality of hidden Markov models by using a Viterbi algorithm; and displaying a button type corresponding to the test sample and a selectable button type based on the output probability.

In one embodiment, the Step S3 further includes: determining whether a classification result is correct according to a button selected by the user; adding a test sample with a correct classification result into the training sample set, wherein a corresponding classification label is the classification result; and adding a test sample with a wrong classification result into the training sample set, wherein a corresponding classification label is a category determined according to the user's selection.

Compared with the existing technologies, the present disclosure has the following advantages. Text input is performed via a smart device by using a facial vibration signal generated when a user speaks, which solves the problem of difficult typing caused by a small screen of the smart device or occupation of the user's hands. Meanwhile, Performing text input based on the facial vibration signal not only avoids an adverse effect of ambient noise, but also avoids adverse effects caused by replay attacks and imitation attacks. Furthermore, the present disclosure also proposes a real-time correction and self-adaptive mechanism for correcting an incorrect identification result and updating a training sample set, which improves identification accuracy and robustness of the text input.

BRIEF DESCRIPTION OF THE DRAWINGS

The following accompanying drawings are merely used to make exemplary illustration and explanation of the present disclosure, and are not intended to limit the scope of the present disclosure, in which.

DETAILED DESCRIPTION

In order to make the objects, technical solutions, design methods and advantages of the present disclosure more apparent, the present disclosure is further described in detail below with reference to the accompanying drawings and specific embodiments. It is to be understood that the specific embodiments described herein are only intended to explain the present disclosure, and are not restrictive of the present disclosure.

In all examples shown and discussed herein, any specific values should be interpreted as merely exemplary and not limiting. Therefore, other examples of the exemplary embodiment may have different values.

Technologies, methods and equipment known to those of ordinary skill in the related art may not be discussed in detail, but where appropriate, the technologies, methods and equipment should be considered as part of the specification.

A further description of the present disclosure is made below with reference to the accompanying drawings and the specific embodiments to facilitate understanding by those skilled in the art.

According to an embodiment of the present disclosure, there is provided a smart device input method based on facial vibration. In short, the method comprises: collecting a facial vibration signal generated when a user speaks; extracting a Mel-frequency cepstral coefficient (MFCC) that can reflect a signal characteristic from the facial vibration signal; and taking the MFCC as an observation sequence to obtain text input expected by the user by using a pregenerated hidden Markov model (HMM). The pregenerated HMM is obtained through training by using the known MFCC and a corresponding button type as a training sample set. The input method in the embodiment of the present disclosure may be used in wearable devices or other types of smart devices. Reference will be made below by taking a smart watch as an example.

Figure 1:
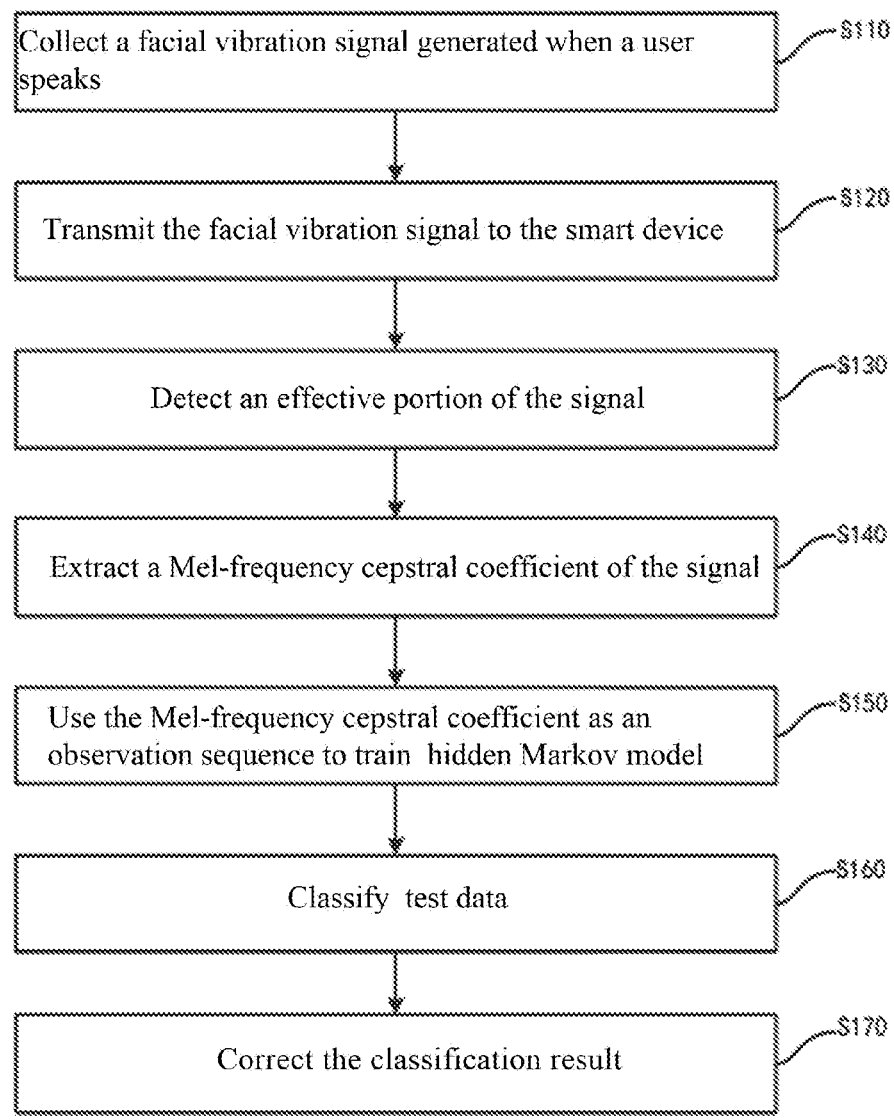
FIG. 1 illustrates a flowchart of a smart device input method based on facial vibration according to an embodiment of the present disclosure.

Referring to FIG. 1, the smart device input method based on facial vibration comprises following steps.

In Step S110, a facial vibration signal generated when a user speaks is collected.

In this step, for a voice input mode, the facial vibration signal generated when the user speaks is collected.

Figure 2:
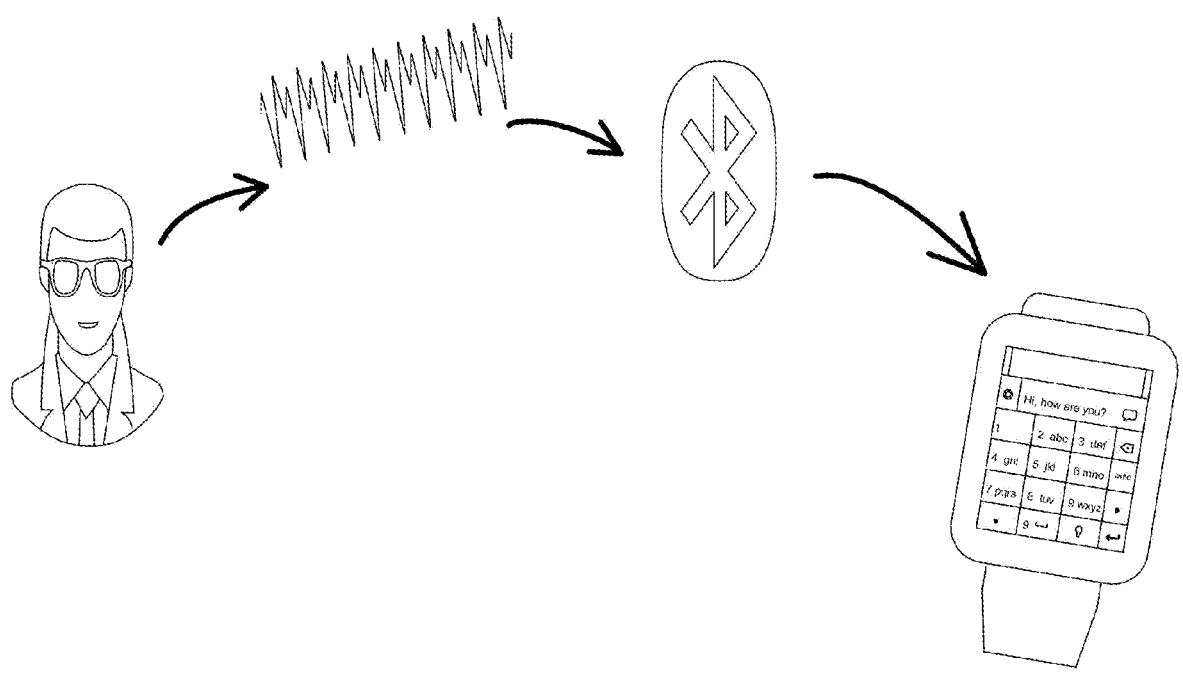
FIG. 2 illustrates a schematic diagram of a smart watch input method based on facial vibration according to an embodiment of the present disclosure.

FIG. 2 illustrates a schematic diagram of a smart watch input method. When the user speaks, a vibration signal is generated. The vibration signal is wirelessly transmitted to the smart watch. The smart watch further processes the vibration signal, extracts characteristics of the vibration signal therefrom, and then recognizes button categories corresponding to different vibration signals.

Figure 3:
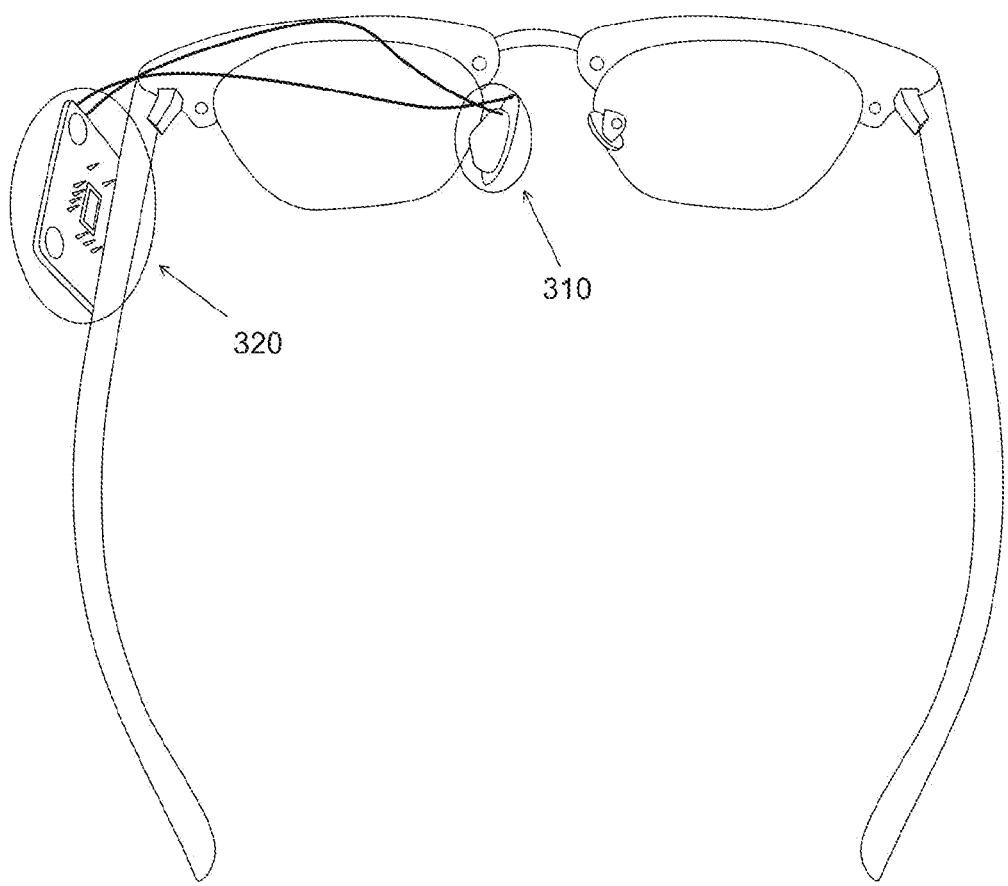
FIG. 3 illustrates a signal sensing device of a smart watch input method based on facial vibration according to an embodiment of the present disclosure.

In one embodiment, a signal sensing module arranged on glasses is utilized to collect the facial vibration signal generated when the user speaks, referring to the signal sensing module 310 as shown in FIG. 3. The signal sensing module 310 may be a piezoelectric film vibration sensor, a piezoelectric ceramic vibration sensor, or other vibration sensors capable of detecting signals. For example, the piezoelectric ceramic vibration sensor is arranged on glasses, the glasses may vibrate when the user speaks. At this moment, the vibration sensor can collect the facial vibration signal generated when the user speaks.

Further, a signal processing module 320 arranged on the glasses may be utilized to receive the facial vibration signal and amplify the facial vibration signal. Next, the amplified facial vibration signal is imported into an analog-to-digital (AD) converter, such that the facial vibration signal is converted into a digital signal.

It is to be understood that the signal sensing module 310 and the signal processing module 320 may be arranged outside the glasses or embedded into the glasses. Furthermore, the vibration sensors, amplifiers, analog-to-digital converters and so on described herein may be commercially available or customized devices, as long as their functionalities can achieve the objectives of the present disclosure.

Figure 4:
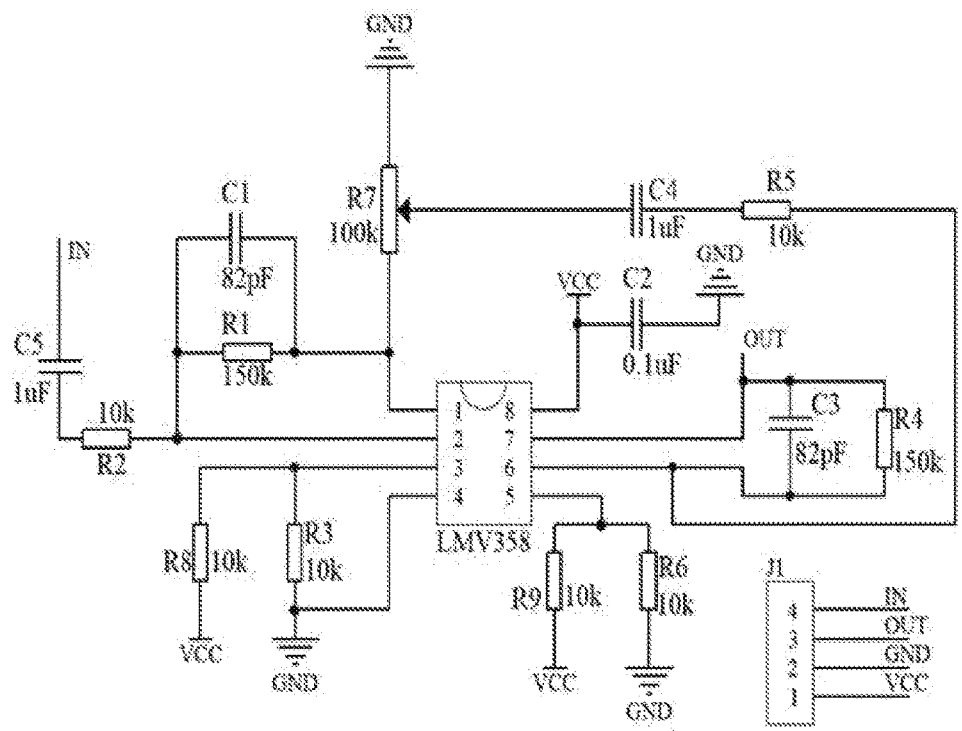
FIG. 4 illustrates a schematic circuit diagram of a signal amplifier according to an embodiment of the present disclosure.
Figure 5:
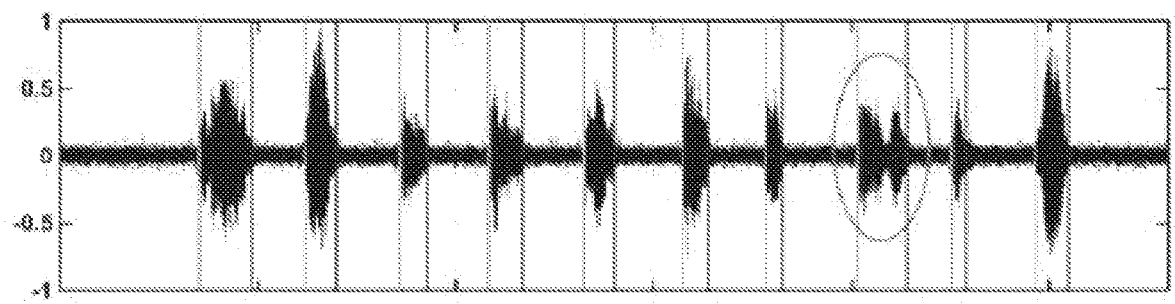
FIG. 5 illustrates a schematic diagram of a section of vibration signal according to an embodiment of the present disclosure.

FIG. 4 illustrates a schematic circuit diagram of an amplifier according to an embodiment of the present disclosure. The amplifier is implemented by a commercially available LMV358, which is a two-stage amplifier with a maximum amplification factor of 225 and an amplification factor of 15 for each stage. In order to filter system noise, each stage of amplifying circuit has a band-pass filter with a frequency range of 15.9 Hz to 12.9 kHz.

Specifically, after being amplified by the amplifier, the vibration signal is imported into an analog-to-digital (AD) converter (such as MCP3008); and the next stage of the AD converter is connected to Raspberry Pi to control the collection and transmission of the facial vibration signal.

It is to be noted that for brevity, the AD converter, the Raspberry Pi and other peripheral circuits are not shown. However, it is to be understood that these circuits or chips required for the embodiments of the present disclosure may all be arranged, as a part of the signal processing module 320, on the glasses.

In Step S120, the facial vibration signal is transmitted to the smart device.

In this step, the amplified and converted facial vibration signal is transmitted to the smart watch via a wireless module. The wireless module includes a Bluetooth transmission module, a WiFi transmission module or other wireless transmission modules capable of transmitting the signal to the smart watch.

For example, the Raspberry Pi is provided to control the Bluetooth module to transmit the digital signal processed in Step S110 to the smart watch.

In Step S130, the smart device detects an effective portion of the signal.

In this step, the smart device intercepts a section from the received facial vibration signal as an effective portion, which further improves the subsequent processing speed while preserving signal characteristics.

In one embodiment, the effective portion of the signal is detected using an energy-based double-threshold method of endpoint detection, which specifically comprises following steps.

In Step S131, after the smart watch receives the facial vibration signal transmitted from the Bluetooth module, the facial vibration signal is filtered using a Butterworth band-pass filter.

A cut-off frequency of the band-pass filter may be, for example, 10 Hz and 1,000 Hz, respectively.

In Step S132, the signal is framed, where a frame length is 7 ms, a frame shift is 3.2 ms, and a window function is Hamming window, and short-term energy of the facial vibration signal is calculated.

For example, a formula for calculating the short-term energy is expressed as:

$$E(t) = \sum_{i=t}^{t+L} s^2(i) \quad (1)$$

where E represents the short-term energy of a frame signal, L represents a length of the frame signal, S(i) represents an amplitude of the vibration signal, and t represents a time index of the frame signal.

In Step S133, a high threshold and a low threshold required when the effective portion is intercepted are set based on the short-term energy of the facial vibration signal.

After the short-term energy of the facial vibration signal is obtained, an energy standard deviation of the vibration signal may be further calculated, which is denoted as σ, and average energy of background noise is calculated too, which is denoted as u.

In one embodiment, the low threshold for intercepting the effective portion is set as TL=u+σ, and the high threshold for intercepting the effective portion is set as TH=u+3α.

In Step S134, a maximum interval threshold and a minimum length threshold between signal peaks are set.

In this step, the maximum interval threshold maxInter and the minimum length threshold minLen between the signal peaks are set for the same vibration signal, which may be set experientially, for example, the maxInter generally is set as 50 frames, and the minLen generally is set as 30 frames.

In Step S135, a frame signal with the largest energy is found out from the signals, and the energy of the frame signal needs to be higher than the set high threshold.

In Step S136, the frame signal extends towards the left and the right respectively until the energy of a next frame signal is lower than the set low threshold, and frame positions at this moment are recorded. The obtained frame position on the left is taken as a starting point of this signal peak, and the obtained frame position on the right is taken as an end point of this signal peak.

After the starting point and the end point are obtained, in this step, frame energy of the position where the signal peak is needs to be set to zero, so as to facilitate subsequent iterative processing of other signal peaks.

It is to be noted that "left" and "right" herein reflect a timing direction. For example, "extending towards the left" refers to searching for a preamble frame of the frame signal, and "extending towards the right" refers to searching for a postamble frame of the frame signal.

In Step S137, Step S135 and Step S136 are repeated until all signal peaks in the entire signal are found out.

In Step S138, if an interval between two signal peaks is less than the maxInter, the two signal peaks are combined. That is, the two signal peaks are regarded as one signal peak.

In this step, by combining the signal peaks, the intervals between all the signal peaks are greater than the maxInter.

In Step S139, if a length of a signal peak is less than the minLen, this signal peak is directly discarded.

After the above processing, for a vibration signal, the number of signal peaks finally obtained should be 1, and this signal peak is the intercepted effective portion of the vibration signal. If the number of signal peaks obtained is greater than 1, this vibration signal is regarded as an ineffective signal and is discarded directly.

FIG. 6 illustrates a segment of vibration signal subjected to the above processing, where an abscissa indicates a sampling value index, and an ordinate indicates normalized amplitude. As can be seen, this segment of vibration signal includes 10 vibration signals, and each vibration signal corresponds to one signal peak. The eighth vibration signal actually contains two small peaks, but since the interval between the two small peaks is less than the maxInter, the two small peaks are treated as one peak. That is, the two small peaks correspond to one vibration signal.

In Step S140, a Mel-frequency cepstral coefficient of the signal is extracted.

In this step, the Mel-frequency cepstral coefficient is extracted from the intercepted effective portion as a signal characteristic.

In one embodiment, extracting the Mel-frequency cepstral coefficient comprises following steps.

Pre-emphasis, framing and windowing are performed on the effective portion of the vibration signal. For example, a coefficient of the pre-emphasis may be set as 0.96, a frame length is 20 ms, the frame shift is 6 ms, and a window function is Hamming window.

Fast Fourier Transform (FFT) is performed on each frame signal to obtain the corresponding frequency spectrum.

A Mel-frequency spectrum is obtained by importing the obtained frequency spectrum into a Mel-frequency filter bank. For example, the Mel-frequency spectrum ranges from 10 Hz to 1,000 Hz, and the number of filter channels is 28.

A logarithm is taken to the obtained Mel-frequency spectrum, then a discrete cosine transform (DCT) is performed, and finally the first 14 coefficients are taken as the Mel-frequency cepstral coefficients (MFCC).

It is to be understood that the number of the extracted Mel-frequency cepstral coefficients is not limited to 14, and an appropriate number of Mel-frequency cepstral coefficients may be extracted according to accuracy and execution speed requirements for a training model. Furthermore, existing technologies such as pre-emphasis, framing, windowing and Fourier transform are not specifically introduced herein.

In Step S150, the Mel-frequency cepstral coefficient is used as an observation sequence to train a hidden Markov model.

In this step, the hidden Markov model (HMM) is trained by using the Mel-frequency cepstral coefficient (MFCC) extracted from the vibration signal as a signal characteristic.

A T9 keyboard is taken as an example, it is necessary to classify ten types of numerics (respectively corresponding to the numerics 0, 1, 2, . . . , 9 on the keyboard), one HMM model is trained for each numeric (ten HMM models in total), and finally an output probability of each HMM model with regard to a certain test sample is calculated, wherein the numeric corresponding to the HMM model having the highest output probability is the classification result of the test sample.

Typically, the HMM model is represented by $\Delta=(A, B, \pi)$, wherein $\pi$ represents an initial state probability matrix, A represents a hidden state transition probability matrix, and B represents a generated matrix of a hidden state to an observation state. For example, a process of training the HMM model using the Baum-Welch algorithm comprises: initializing parameters of the HMM; calculating forward and backward probability matrices; calculating a transition probability matrix; calculating a mean and a variance of each Gaussian probability density function; calculating a weight of each Gaussian probability density function; and calculating output probabilities for all the observation sequences, and adding up to obtain a total output probability.

Specifically, training of the HMM model corresponding to the numeric "0" is taken as an example, where the number of states N is 3, and the number M of Gaussian mixtures contained in each state is 2. The training process comprises following steps.

A plurality of (for example, ten) vibration signals are collected for the numeric "0", and then Mel-frequency cepstral coefficients corresponding to the ten vibration signals are obtain as the signal characteristics. That is, the training sample set corresponding to the numeric "0" includes ten samples.

The initial state probability matrix $\pi$ is initialized as [1,0,0], and the hidden state transition probability matrix A is initialized as:

$$\begin{bmatrix} 0.5 & 0.5 & 0 \\ 0 & 0.5 & 0.5 \\ 0 & 0 & 1 \end{bmatrix}.$$

Next, each observation sequence (i.e., an MFCC parameter) of the numeric "0" is evenly segmented according to the number of states N, and the MFCC parameters belonging to one segment in all the observation sequences constitute a large matrix, and the k-means algorithm is used for clustering to calculate a mean, a variance and a weight coefficient for each Gaussian element.

A forward probability, a backward probability, a calibration coefficient array, a transition probability and a mixed output probability are calculated for each observation sequence (i. e., MFCC parameter).

The transition probability of the HMM model is recalculated according to the transition probabilities of the ten observation sequences, and in the meanwhile, a mean, a variance, and a weight coefficient or the like are recalculated for the relevant Gaussian probability density function according to the mixed output probability.

Finally, output probabilities are calculated for all the observation sequences and are added up to obtain the total output probability.

Because the embodiments of the present disclosure are deployed on a smart watch, considering limited computing resources, the training process may only be iterated once.

In summary, a problem solved by the present disclosure is to provide an MFCC feature (i.e., an observation sequence) of a signal and an HMM model $\lambda=(A, B, \pi)$, and then the output probability of the observation sequence to the HMM model is calculated. In the embodiments of the present disclosure, a corresponding HMM is generated for each button type, and each observation sequence is composed of a Mel-frequency cepstral coefficient of a facial vibration signal, and finally the HMM that is the most likely to generate a pronunciation represented by the observation sequence is evaluated.

In Step S160, test data are classified.

In this step, the test sample is classified using the hidden Markov model generated in Step S150.

In one embodiment, the classification comprises: calculating an output probability of the test sample for each of the hidden Markov models by using a Viterbi algorithm, and providing an optimal state path.

The category corresponding to the hidden Markov model with the maximum output probability is a classification result of the test sample.

In Step S170, the classification result is corrected.

To improve the identification accuracy of the hidden Markov model, the classification result may be corrected using a real-time correction and self-adaptive mechanism to optimize the training sample set used in Step S150.

Specifically, in Step S160, in addition to outputting the final classification result, two most likely candidate buttons and the "Delete" button are also provided according to the output probability of each hidden Markov model. When the classification result is correct, the user does not need to perform any operation. When the classification result is wrong, if the correct classification result appears in the candidate button, the user may click the candidate button to make corrections. However, if the correct classification result does not appear in the candidate button, the user needs to input the correct numeric to make corrections by using a built-in virtual keyboard of the smart watch. If a wrong numeric is inputted due to incorrect pronunciation or wearing glasses, the user may click the "Delete" button to delete the wrong numeric inputted.

In one embodiment, the correcting the classification result comprises following steps.

In Step S171, if the user neither clicks any button nor uses the built-in virtual keyboard to input, this means that the classification result of this input is correct, and the facial vibration signal corresponding to this input is added into the training sample set once.

In Step S172, if the user clicks the candidate button, it means that the classification result of this input is wrong, and if the correct classification result of this input appears in the candidate button, the facial vibration signal corresponding to this input will be added into the training sample set $n_i$ times.

The $n_i$ represents the number of consecutive incorrect keystrokes of the button i, $1 \leq n_i \leq 3$. For example, if the classification result of the button 2 is consecutively wrong twice, the $n_i$ is equal to two. If the number of consecutive incorrect keystrokes of the button i exceeds three, the $n_i$ is still set to three. Once the classification result of the button i is correct, the $n_i$ is reset to one.

In Step S173, if the user uses the built-in virtual keyboard of the smart watch to input a numeric, this means that the classification result of this input is wrong, and if the correct classification result of this input does not appear in the candidate button, the facial vibration signal corresponding to this input will be added into the training sample set three times.

In Step S174, if the user clicks the "Delete" button, this means that the user made an error during the input. In this case, the facial vibration signal corresponding to the input will be directly discarded.

In Step S175, it is determined whether the hidden Markov model needs to be retrained.

The total number of times indicating that each button is added into the training sample set is define as $Q_i$, and the total number of times indicating that all buttons are added into the training sample set is define as N, then the following equation may be obtained:

$$N = \sum_{i=0}^{9} Q_i.$$

When N is greater than or equal to 10, the hidden Markov model will be retrained. Once the number of training samples corresponding to a certain button is greater than 35, training samples of the button the earliest added into the training sample set will be discarded, so as to ensure that the maximum number of training samples of this button is 35.

It is to be understood that for specific values involved in the embodiments of the present disclosure, such as the number of training samples and the number of times indicating that a button is added into the training sample set, those skilled in the art may set appropriate values according to model training accuracy, and execution speed requirements for text input, etc.

It is to be noted that although the steps are described in a specific order above, it does not mean that the steps must be executed in the specific order mentioned above. In fact, some of these steps can be executed concurrently, or even the order can be changed, as long as required functionalities can be implemented.

The present disclosure may be a system, a method, and/or a computer program product. The computer program product may include a computer readable storage medium having computer readable program instructions thereon for causing a processor to carry out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

The descriptions of the various embodiments of the present disclosure have been presented above for purposes of illustration, but are not intended to be exhaustive or limited to the embodiments disclosed. Therefore, it is apparent to an ordinary skilled person in the art that modifications and variations could be made without departing from the scope and spirit of the embodiments. The terminology used herein is chosen to best explain the principles of the embodiments, the practical application or technical improvement over technologies found in the marketplace, or to enable others of ordinary skill in the art to understand the embodiments disclosed herein.

What is claimed is:

1. A smart device input method based on facial vibration, comprising:
   step S1: collecting a facial vibration signal generated when a user performs voice input and transmitting the facial vibration signal to a smart watch in a wireless way;
   step S2: extracting a Mel-frequency cepstral coefficient from the facial vibration signal, and the Mel-frequency cepstral coefficients are the first 14 coefficients extracted by taking the logarithm of the Mel-frequency spectrum and performing discrete cosine transform; and
   step S3: taking the Mel-frequency cepstral coefficient as an observation sequence to obtain text input corresponding to the facial vibration signal by using a trained hidden Markov model;
   wherein the trained hidden Markov model is obtained by steps of:
   generating a hidden Markov model corresponding to each input button type of the smart watch to obtain a plurality of hidden Markov models;
   constructing a training sample set corresponding to each of the plurality of hidden Markov models, and each observation sequence in the training sample set comprises the Mel-frequency cepstral coefficient of the facial vibration signal; and
   evaluating a most possible hidden Markov model as the trained hidden Markov model, and the most possible hidden Markov model generates a pronunciation represented by the observation sequence;
   wherein step S3 further comprises steps of:
   calculating an output probability of a test sample for the plurality of hidden Markov models by using a Viterbi algorithm; and
   displaying a button type corresponding to the test sample and a selectable button type based on the output probability;
   wherein, the facial vibration signal is obtained by steps of:
   collecting an original facial vibration signal by a vibration sensor arranged on glasses;
   receiving the original facial vibration signal by a signal processing module disposed on the glasses, and the facial vibration signal is obtained after amplification processing and analog-to-digital conversion;
   wherein, the smart device input method further comprising steps of:
   determining whether a classification result is correct according to a button selected by the user;
   adding a first test sample with a correct classification result into the training sample set, wherein a corresponding classification label is the classification result; and
   adding a second test sample with a wrong classification result into the training sample set, wherein a corresponding classification label is a category determined according to the user's selection.

2. The smart device input method according to claim 1, wherein in step S2, a vibration signal is processed by:
   amplifying the facial vibration signal to obtain an amplified facial vibration signal;

transmitting the amplified facial vibration signal to a smart device via a wireless module; and intercepting a section from the amplified facial vibration signal as an effective portion and extracting the Mel-frequency cepstral coefficient from the effective portion by the smart watch.

3. The smart device input method according to claim 2, wherein the step of intercepting the section from the amplified facial vibration signal as the effective portion comprises steps of:

setting a first cut-off threshold and a second cut-off threshold based on a short-term energy standard deviation σ of the amplified facial vibration signal, wherein the first cut-off threshold is $TL=u+\sigma$, the second cut-off threshold is $TH=u+3\sigma$, and u represents average energy of background noise;

finding out a frame signal having a maximum short-term energy from the amplified facial vibration signal, wherein energy of the frame signal is higher than the second cut-off threshold; and respectively finding out, from a preamble frame before the frame signal and a postamble frame after the frame signal, a frame having energy lower than the first cut-off threshold, wherein the frame is closest to the frame signal in time sequence, taking an obtained preamble frame position as a starting point and taking an obtained postamble frame position as an end point, and intercepting a portion between the starting point and the end point as the effective portion of the amplified facial vibration signal.

4. The smart device input method according to claim 3, wherein the step of intercepting the section from the amplified facial vibration signal as the effective portion further comprises steps of:

setting, for a vibration signal, a maximum interval threshold and a minimum length threshold between signal peaks; and taking two signal peaks as one signal peak of the vibration signal in response to an interval between the two signal peaks of the vibration signal being less than the maximum interval threshold; and discarding a signal peak in response to a length of the signal peak of the vibration signal being less than the minimum length threshold.

5. A non-transitory computer readable storage medium, storing a computer program, wherein when being executed by a processor, the computer program implements steps of the smart device input method according to claim 1.

6. A computer device, comprising a memory and a processor, a computer program, wherein the computer program runs in the processor and is stored in the memory, and the processor executes steps of the smart device input method according to claim 1.

* * * * *